US011534979B2

(12) United States Patent
Wasmer et al.

(10) Patent No.: US 11,534,979 B2
(45) Date of Patent: Dec. 27, 2022

(54) IN SITU AND REAL TIME QUALITY CONTROL IN ADDITIVE MANUFACTURING PROCESS

(71) Applicant: EMPA EIDGENÖSSISCHE MATERIALPRÜFUNGS- UND FORSCHUNGSANSTALT, Dübendorf (CH)

(72) Inventors: Kilian Wasmer, Choex (CH); Sergey Shevchik, Zürich (CH); Farzad Vakili Farahani, Rüfenacht (CH); Georgios Violakis, Thun (CH); Sébastien Vaucher, Thun (CH)

(73) Assignee: EMPA Eidgenössische Materialprüfungs- und Forschungsanstalt, Dübendorf (CH)

( * ) Notice: Subject to any disclaimer, the term of this patent is extended or adjusted under 35 U.S.C. 154(b) by 0 days.

(21) Appl. No.: 17/081,335

(22) Filed: Oct. 27, 2020

(65) Prior Publication Data

US 2021/0039324 A1    Feb. 11, 2021

Related U.S. Application Data

(62) Division of application No. 16/310,138, filed as application No. PCT/EP2017/064121 on Jun. 9, 2017, now Pat. No. 10,821,674.

(30) Foreign Application Priority Data

Jun. 15, 2016   (EP) .................................... 16174511

(51) Int. Cl.
   *B29C 64/393*   (2017.01)
   *B22F 3/105*    (2006.01)
   (Continued)

(52) U.S. Cl.
   CPC ............ *B29C 64/393* (2017.08); *B22F 10/00* (2021.01); *B22F 10/20* (2021.01); *B29C 64/153* (2017.08);
   (Continued)

(58) Field of Classification Search
   CPC .... G01N 29/12; G01N 29/2418; G01N 29/14; G01D 5/35354
   (Continued)

(56) References Cited

U.S. PATENT DOCUMENTS 4,980,007 A * 12/1990 Ferguson ............... G02B 6/448
                                                        156/271
5,076,881 A * 12/1991 Ferguson ............... G02B 6/448
                                                        156/522
(Continued)

FOREIGN PATENT DOCUMENTS

CN    102 680 263 B     5/2015
EP       581680 A1 *    2/1994    ........... G02B 6/4482
(Continued)

OTHER PUBLICATIONS

English translation of International Preliminary Report dated Dec. 18, 2018 with Written Opinion for PCT/EP2017/064121 filed Jun. 9, 2017.

(Continued)

*Primary Examiner* — Kaveh C Kianni
(74) *Attorney, Agent, or Firm* — Paul D. Bianco; Gary S. Winer; Fleit Intellectual Property Law

(57) ABSTRACT

Use of a sensor read out system with at least one fiber optical sensor, which is connected via at least one signal line to a processing unit as part of an additive manufacturing setup, for in situ and real time quality control of a running additive manufacturing process. Acoustic emission is measured via the at least one fiber optical sensor in form of fibers with (Continued)

Bragg grating, fibre interferometer or Fabry-Perot structure, followed by a signal transfer and an analysis of the measured signals in the processing unit, estimation of the sintering or melting process quality due to correlation between sintering or melting quality and measured acoustic emission signals and subsequent adaption of ion and electron beams, microwave or laser sintering or melting parameters of a ion and electron beams, microwave or laser electronics of the additive manufacturing setup in real times via a feedback loop as a result of the measured acoustic emission signals after interpretation with an algorithmic framework in the processing unit.

5 Claims, 11 Drawing Sheets

(51) Int. Cl.
| | | |
|---|---|---|
| B29C 64/153 | (2017.01) | |
| G01D 5/353 | (2006.01) | |
| G01N 29/12 | (2006.01) | |
| G01N 29/14 | (2006.01) | |
| G01N 29/24 | (2006.01) | |
| B22F 10/20 | (2021.01) | |
| B22F 10/00 | (2021.01) | |
| B33Y 30/00 | (2015.01) | |
| B22F 10/30 | (2021.01) | |
| B22F 10/10 | (2021.01) | |

(52) U.S. Cl.
CPC ......... *G01D 5/35354* (2013.01); *G01N 29/12* (2013.01); *G01N 29/14* (2013.01); *G01N 29/2418* (2013.01); *B22F 10/10* (2021.01); *B22F 10/30* (2021.01); *B22F 2999/00* (2013.01); *B33Y 30/00* (2014.12)

(58) Field of Classification Search
USPC .......................................................... 385/12
See application file for complete search history.

(56) References Cited

U.S. PATENT DOCUMENTS

| | | | | |
|---|---|---|---|---|
| 5,412,497 | A * | 5/1995 | Kaetsu | G02B 6/4471 398/164 |
| 5,427,733 | A | 6/1995 | Benda et al. | |
| 5,508,489 | A | 4/1996 | Benda et al. | |
| 6,216,540 | B1 | 4/2001 | Nelson | A61B 5/0507 73/633 |
| 6,305,848 | B1 * | 10/2001 | Gregory | G02B 6/4292 385/88 |
| 6,562,523 | B1 * | 5/2003 | Wu | G03F 1/50 430/323 |
| 6,584,257 | B1 * | 6/2003 | Hurley | G02B 6/4471 385/109 |
| 6,868,219 | B2 * | 3/2005 | Lipski | G02B 6/4452 385/135 |
| 6,952,532 | B2 * | 10/2005 | Dair | G02B 6/4246 398/139 |
| 7,116,912 | B2 * | 10/2006 | Pang | G02B 6/4277 398/139 |
| 2001/0002943 | A1 * | 6/2001 | Nagayama | G02B 6/4482 385/115 |
| 2001/0030855 | A1 * | 10/2001 | Green | G02B 6/4284 361/754 |
| 2002/0008463 | A1 * | 1/2002 | Roach | G09F 9/305 257/E25.02 |
| 2002/0019305 | A1 * | 2/2002 | Wu | C03C 23/004 501/56 |
| 2002/0197032 | A1 * | 12/2002 | Conrad | G02B 6/4482 385/114 |
| 2003/0016924 | A1 * | 1/2003 | Thompson | G02B 6/4482 385/114 |
| 2003/0053786 | A1 * | 3/2003 | Kato | G02B 6/43 385/24 |
| 2003/0174953 | A1 * | 9/2003 | Carnevale | G02B 6/4472 385/39 |
| 2006/0045417 | A1 * | 3/2006 | Morita | H04B 10/801 385/14 |
| 2006/0211294 | A1 * | 9/2006 | Lipski | G02B 6/4452 439/527 |
| 2011/0110635 | A1 * | 5/2011 | Toge | G02B 6/441 385/102 |
| 2012/0045166 | A1 * | 2/2012 | Trotabas | G02B 6/448 29/527.2 |
| 2013/0028563 | A1 * | 1/2013 | Matsuzawa | G02B 6/4482 385/120 |
| 2014/0016905 | A1 * | 1/2014 | Tanabe | G02B 6/4405 385/114 |
| 2014/0314382 | A1 * | 10/2014 | Sato | G02B 6/4434 385/103 |
| 2015/0072337 | A1 * | 3/2015 | Lapotko | G01N 21/636 435/283.1 |
| 2015/0346445 | A1 * | 12/2015 | Blazer | G02B 6/4433 385/114 |
| 2016/0091686 | A1 * | 3/2016 | Erdman | G02B 6/428 385/135 |
| 2016/0098825 | A1 | 4/2016 | Dave et al. | |
| 2017/0165751 | A1 * | 6/2017 | Buller | B23K 26/702 |
| 2017/0219790 | A1 * | 8/2017 | Debban | G02B 6/4403 |
| 2017/0219792 | A1 * | 8/2017 | Debban | G02B 6/4483 |
| 2017/0239719 | A1 * | 8/2017 | Buller | G05B 19/4099 |
| 2017/0304894 | A1 * | 10/2017 | Buller | B29C 64/153 |
| 2017/0336566 | A1 * | 11/2017 | Burek | G02B 6/2553 |
| 2018/0039035 | A1 * | 2/2018 | Chiasson | G02B 6/4403 |
| 2018/0117845 | A1 * | 5/2018 | Buller | B29C 64/20 |
| 2018/0154484 | A1 * | 6/2018 | Hall | B23K 26/082 |
| 2019/0345478 | A1 * | 11/2019 | Lapotko | G01N 21/636 |

FOREIGN PATENT DOCUMENTS

| | | | | |
|---|---|---|---|---|
| EP | 753777 | A2 * | 1/1997 | ............... G02B 6/245 |
| JP | 2016099458 | A * | 5/2016 | ............... G02B 6/44 |
| WO | 2016/081651 | A1 | 5/2016 | |
| WO | WO-2016080195 | A1 * | 5/2016 | ............... G02B 6/44 |

OTHER PUBLICATIONS

International Search Report dated Aug. 21, 2017 with Written Opinion: for PCT/EP2017/064121 filed Jun. 9, 2017.
Haixi Wu et al: "In situ monitoring of FDM machine condition via acoustic emission", International Journal of Advanced Manufacturing Technology., Sep. 17, 2815 (2815-89-17), XP855328139, London; GB ISSN: 8268-3768, DOI: 18. 1887/s88178-815-7889-4 col. 4 / 1. 15-25.

* cited by examiner

1100 Wt

1200 Wt

1300 Wt

1400 Wt

1500 Wt

Fig. 3a
Fig. 3b
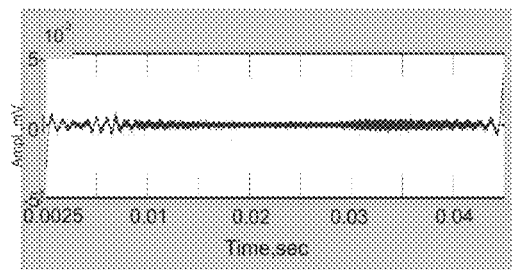
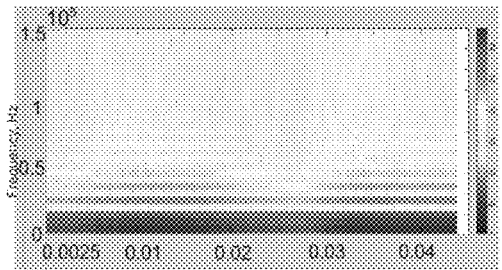
1100 Wt
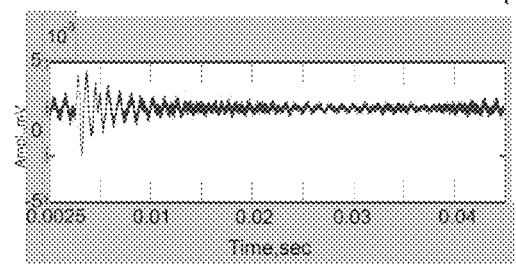
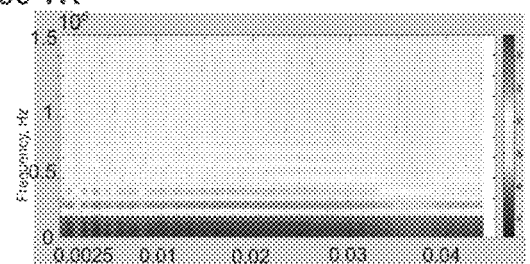
1200 Wt
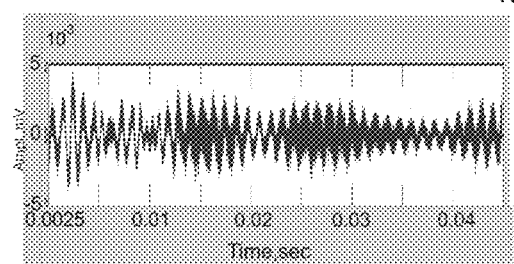
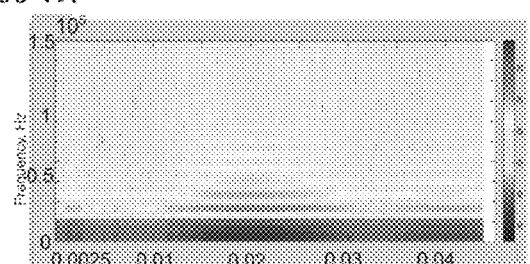
1300 Wt
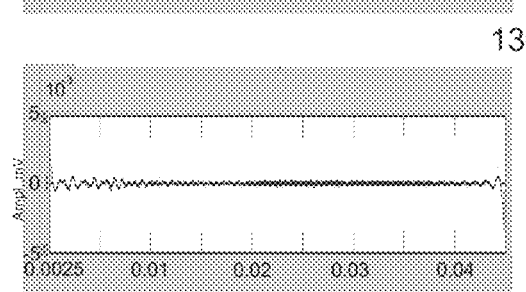
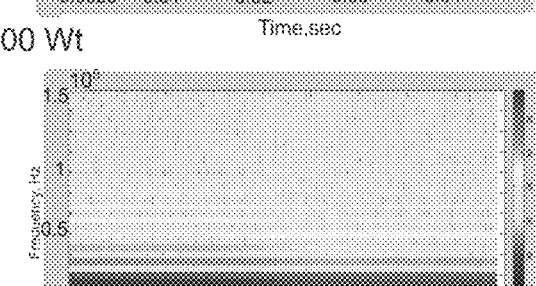
1400 Wt
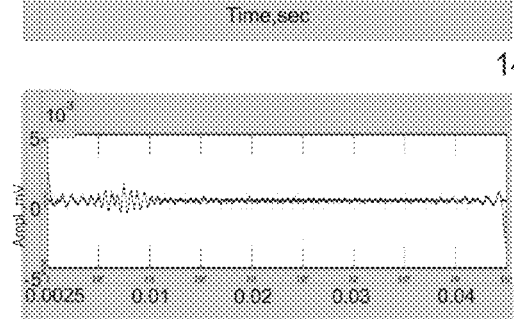
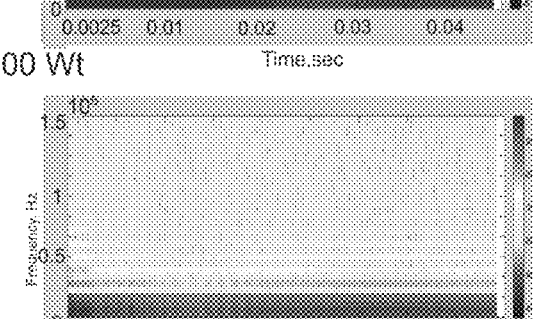
1500 Wt Fig. 4a
Fig. 4b
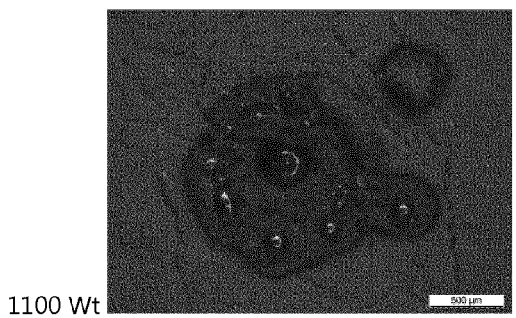
1100 Wt
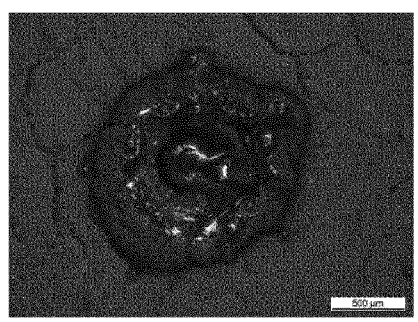
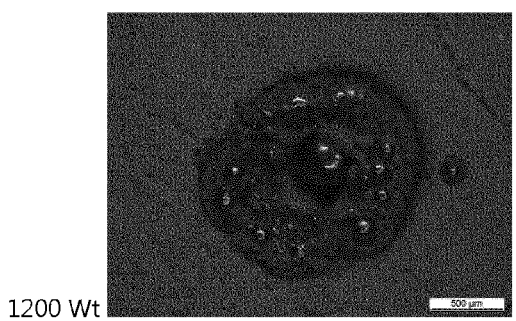
1200 Wt
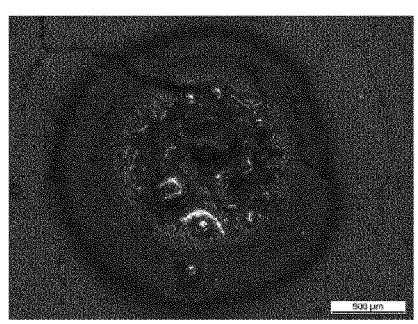
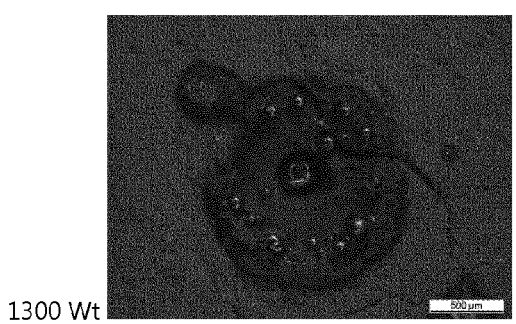
1300 Wt
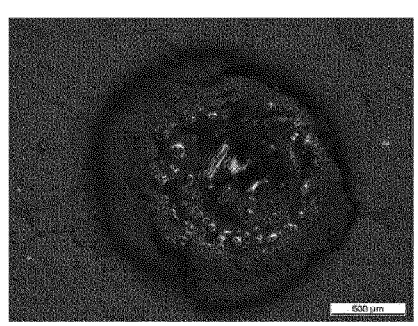
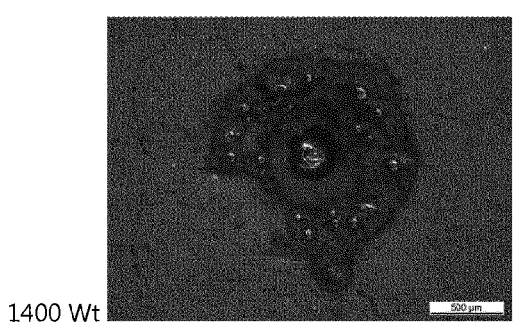
1400 Wt
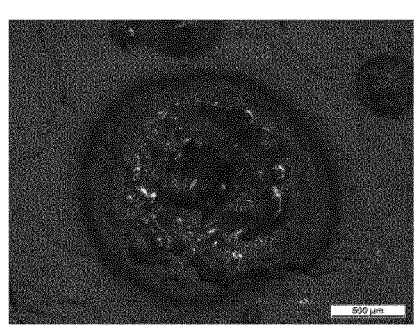
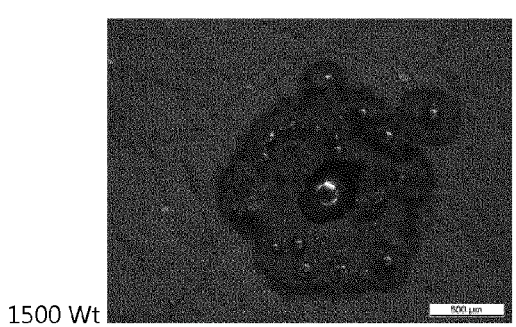
1500 Wt
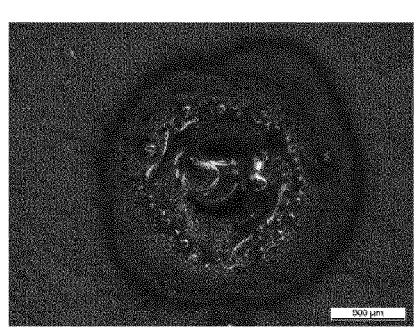

Fig. 5a
Irradiation power, Wt | Pulse num. | *Energy distribution in wavelet packet nodes*
Fig. 5b
*Nodes with maximum variation*
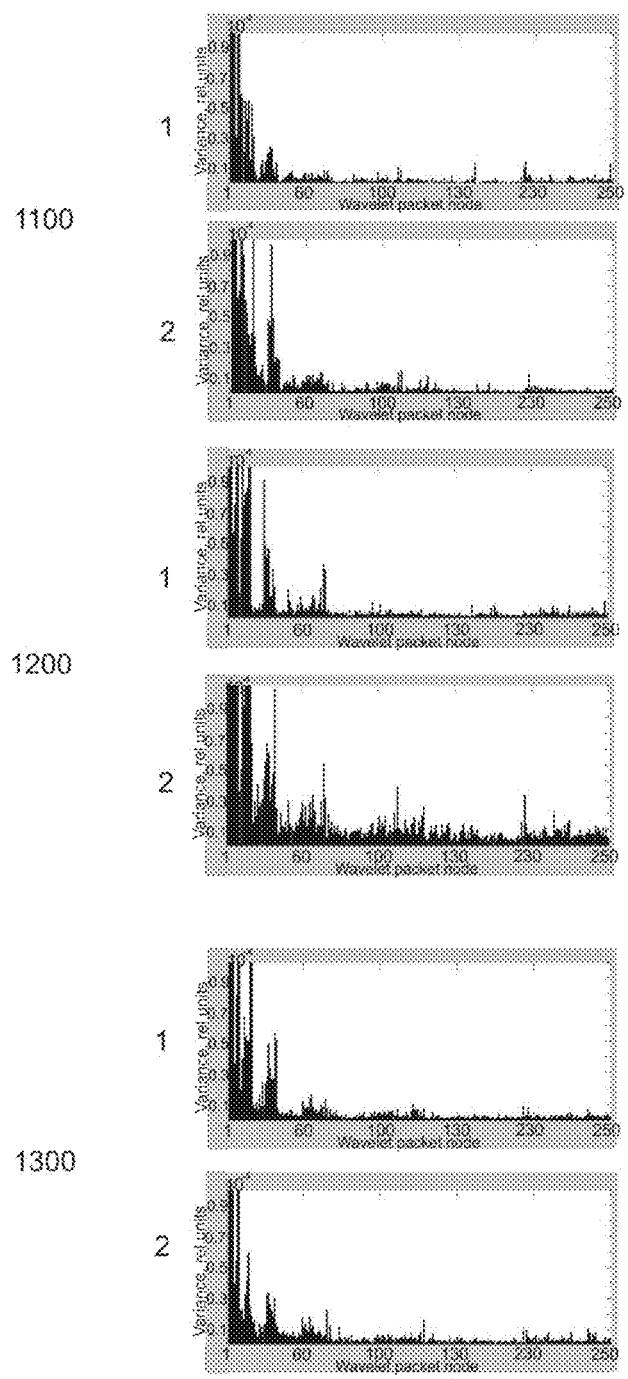
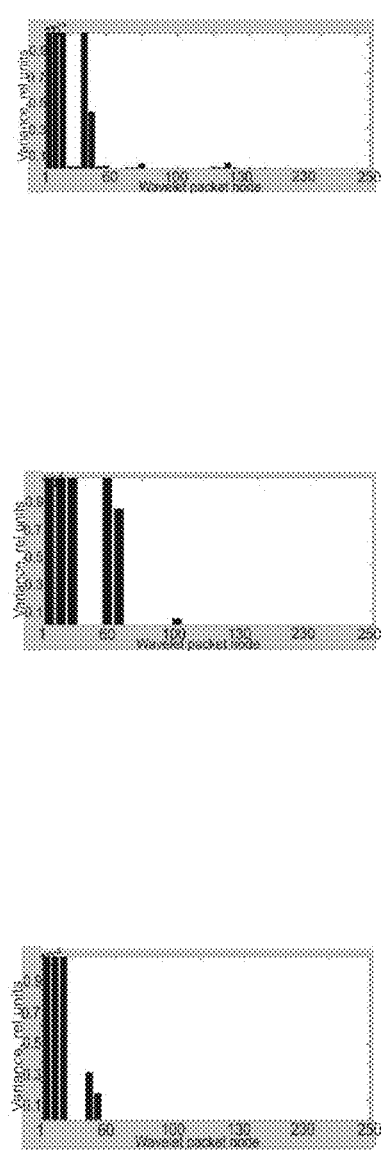

Fig. 5c
Fig. 5d
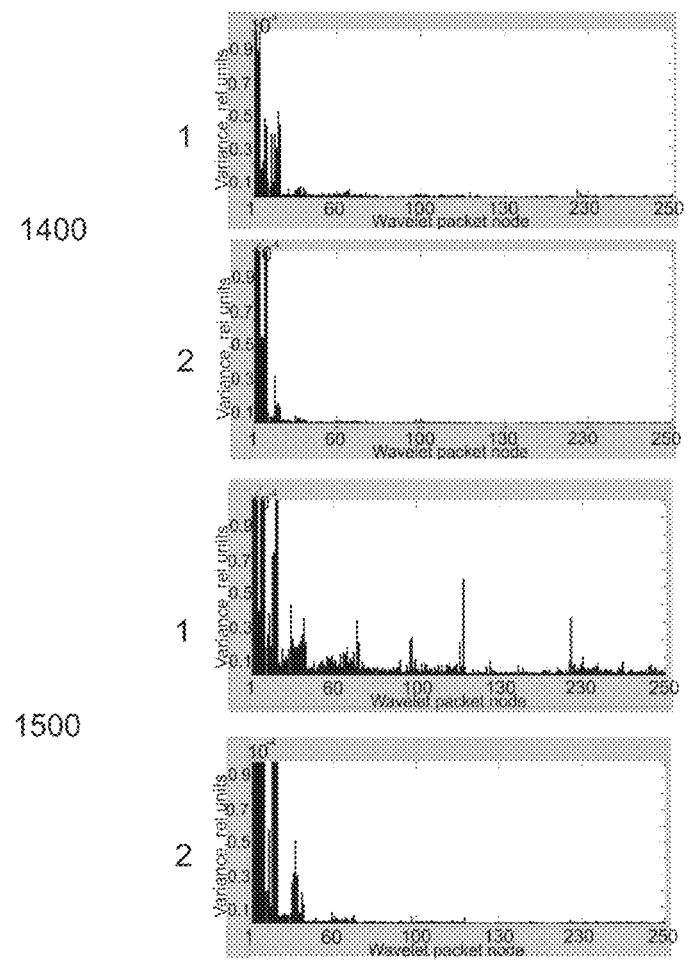
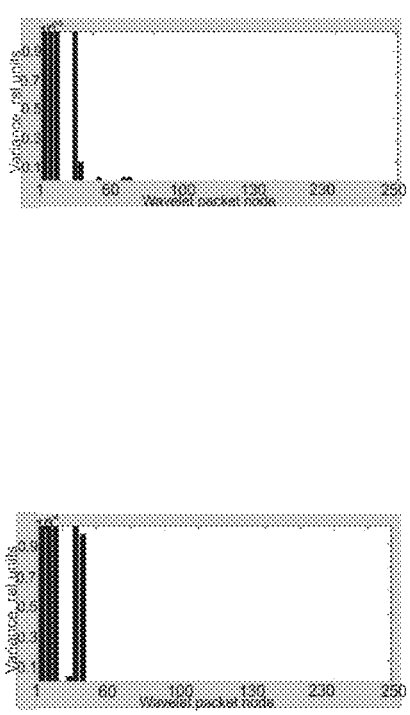

IN SITU AND REAL TIME QUALITY CONTROL IN ADDITIVE MANUFACTURING PROCESS

TECHNICAL FIELD

The present invention describes a use of sensor read out system with at least one fiber optical sensor, which is connected via at least one signal line to a processing unit as part of an additive manufacturing setup, for in situ and real time quality control of a running ion and electron beams, microwave or laser additive manufacturing process, a method for in situ and real time quality control of an additive manufacturing process in an ion and electron beams, microwave or laser sintering or melting setup, using an ion and electron beams, microwave or laser source and an ion and electron beams, microwave or laser focusing device controlled by an ion and electron beams, microwave or laser electronics for focusing an ion and electron beams, microwave or laser beam on a process surface of a sintering or melting body in an ion and electron beams, microwave or laser irradiation focused spot with controllable ion and electron beams, microwave or laser parameters during the running additive manufacturing process and an additive manufacturing setup, comprising an ion and electron beams, microwave or laser electronics, an ion and electron beams, microwave or laser source and an ion and electron beams, microwave or laser focusing device for focusing an ion and electron beams, microwave or laser beam on a process surface of a sintering or melting body in an ion and electron beams, microwave or laser irradiation focused spot with controllable ion and electron beams, microwave or laser parameters.

STATE OF THE ART

Additive manufacturing in particular using laser induced powder sintering or melting is a recent promising technology that already is involved in a wide variety of applications. It has obvious economic and technical advantages compared to traditional manufacturing methods, though its further penetration into market of industrial applications is strongly constrained by two factors: 1) low repeatability of mechanical properties of parts in manufacturing line and 2) low mechanical strength of the parts compare to the equivalents, produced by traditional methods, such as mechanical processing of a material solid (National Institute of Standards and Technology (NIST), Measurement Science Roadmap for Metal-Based Additive Manufacturing, 2013).

One of the reasons for this is the complexity of underlying physical phenomena, especially laser and heat transport inside the micro/nano particles medium. This implies multiple difficulties in creation of accurate physical models of the process and categorization/analysis of already accumulated statistical data. This brings to necessity the development of new robust methods for effective sintering or melting quality control.

The main stream in the field of additive manufacturing quality control is the measurement of the temperature in the sintering or melting zone.

Until now, the main focus of investigations in this field was diligently kept on direct temperature measurements in the process zone. Different sensors, such as pyrometers, photo diodes and matrix CCD detectors were employed in order to measure temperature during the additive manufacturing process has been disclosed in U.S. Pat. No. 5,427,733 or 5,508,489.

Multiple correlation models between the additive manufacturing quality and temperature dynamics were presented, though until now, this method cannot be used as a standalone. The reason is in numerous technical problems that occur around temperature measurements. Measuring the temperature from a narrow spot, which corresponds to the ion beam, microwave or laser focused area, requires additional microscopic system that increases the costs and complexity of the machinery. Often, there are no possibilities to carry out ion, microwave or laser beam coaxial temperature measurements and this affects the manufacturing quality. The use of the matrix photodetectors (CCD), which is reported in many publications, provides with a relatively low time resolution as compared to the temperature transients in heat affected material powder. This results in low time resolution of the acquired signals. All these factors, together with the inaccuracy of data interpretation (due to nonlinear dynamics) and modelling complexity do not provide an effective solution.

A more detailed overview of this class of methods can be found in (Zeng, K., Pal, D., and Stucker, B., A Review of Thermal Analysis Methods in Laser Sintering and Selective Laser Melting, Proceedings of the Solid Freeform Fabrication Symposium, Austin, Tex., pp. 796-814, 2012). Providing with rich information about the temperature dynamics, this approach does not allow creating full fledge quality control system. The main reasons are in the complexity of the ion beam, microwave or laser-powder interaction processes and thus inaccuracy of the heat transfer models.

To avoid the purely temperature approach disadvantages, alternative solutions are presented in (Kleszczynski, S., zur Jacobsmühlen, J., Sehrt, J., and Witt, G., 2012, Error Detection in Laser Beam Melting Systems by High Resolution Imaging, Proceedings of the Solid Freeform Fabrication Symposium, pp. 975-987). These works describe image processing systems, in which the simple visible light CCD camera captures images of the sintered or melted parts and detects defects using special image processing algorithm. The disadvantage is in the relatively low frame acquisition rate of cameras in the visible light (which is counted by hundreds of frames per second). Due to this, the defects detection is carried out on a large scale (when the layer of the part is printed and no possibility to improve the quality exists anymore). Furthermore, the detectable defect size is defined by the spatial resolution of the camera's objective lens and tends to increase while producing big parts. The great disadvantage is that the quality control is carried out layer by layer, e.g. post factum, when a big part is manufactured, which is not very cost effective. No methods are known to improve the additive manufacturing process in real time.

Combined methods with video processing and pyrometric measurements can be found in (Doubenskaia, M., Pavlov, M., and Chivel, Y.; Optical System for On-line Monitoring and Temperature Control in Selective Laser Melting Technology, Key Eng. Mater., 437, pp. 458-461, 2010). The method takes the advantages of both approaches and shows good results, though it still works in a macroscopic scale analyzing already manufactured layers and not giving a possibility to remove the defects.

According to WO2016081651 it was tried to improve additive manufacturing processes in real time and in situ by measuring acoustic emission, followed signal transfer and signal processing with suitable hardware, for estimation of the additive manufacturing process quality due to correlation between melting quality and measured acoustic emission signals. Although the used emission sensor detects microcracks within the workpiece, the accuracy and sensitivity of the quality control could not be good enough. An improvement could only be reached by increasing the complexity of the quality control setup with more sensors. Perhaps use of optical sensors according to CN102680263 could improve the quality of additive manufacturing methods, due to real time detection of optical parameters, but there are many unsettled problems to be solved, which cannot be reached by simple combination of both prior art documents.

SUMMARY OF THE INVENTION

The object of the present invention is to enable an in situ and real time quality control in additive manufacturing in form of laser sintering or melting processes of particles/powder samples, without the above mentioned disadvantages.

This problem is solved by use of the quality control setup and a novel method as well as a novel apparatus for ion beam, microwave or laser sintering or melting. A monitoring of the sintering or melting quality on the fly using acoustic emission (AE) signals while ion beam, microwave or laser sintering or melting process, in particular by using fibre optical sensors. Based on the measured signals, the sintering or melting ion beam, microwave or laser parameters can be optimized via a self-contained feedback control loop. Therefore, a quality control and an adaptation of next sintering or melting parameters are possible.

It was found out that the level of acoustic signals emitted during local heat of the material powder can be detected and the content of the signal includes the information about the sintering or melting quality. This content is unique and depends on heat distribution and particles interaction inside the sintering or melting zone and thus the estimation of the quality is possible. Although the AE—signal are weak during sintering or melting, the signals are still detectable by the fiber optical sensor read out system.

The disclosed quality control method uses a completely different approach from existing methods and can be used standalone or together with prior art methods.

BRIEF DESCRIPTION OF THE DRAWINGS

A preferred exemplary embodiment of the subject matter of the invention and recorded and calculated results of quality control of sintering or melting processes are described below in conjunction with the attached drawings.

FIG. 2a shows acoustic emission signals from particles sintering or melting while heating with one single laser pulse at different energies, while

FIG. 3a shows acoustic emission signals from particles reiterated sintering or melting achieved by applying a second pulse to already sintered or melted particles volume, while FIG. 3b shows the associated frequency spectrograms. The process parameters are similar to those listed within FIG. 2b description.

FIGS. 4a and 4b are showing images of iron micro particles after sintering or melting by applying one (FIG. 4a) and two (FIG. 4b) laser pulses. The correspondent AE signals are presented in FIGS. 2a and 3a.

FIGS. 5a and 5c are showing the energy stored in the wavelet packet tree nodes and FIGS. 5b and 5d the nodes from each pair of events that discover the maximum variance and the latter is defined with Principal Component Analysis (PCA).

DESCRIPTION

Figure 1:
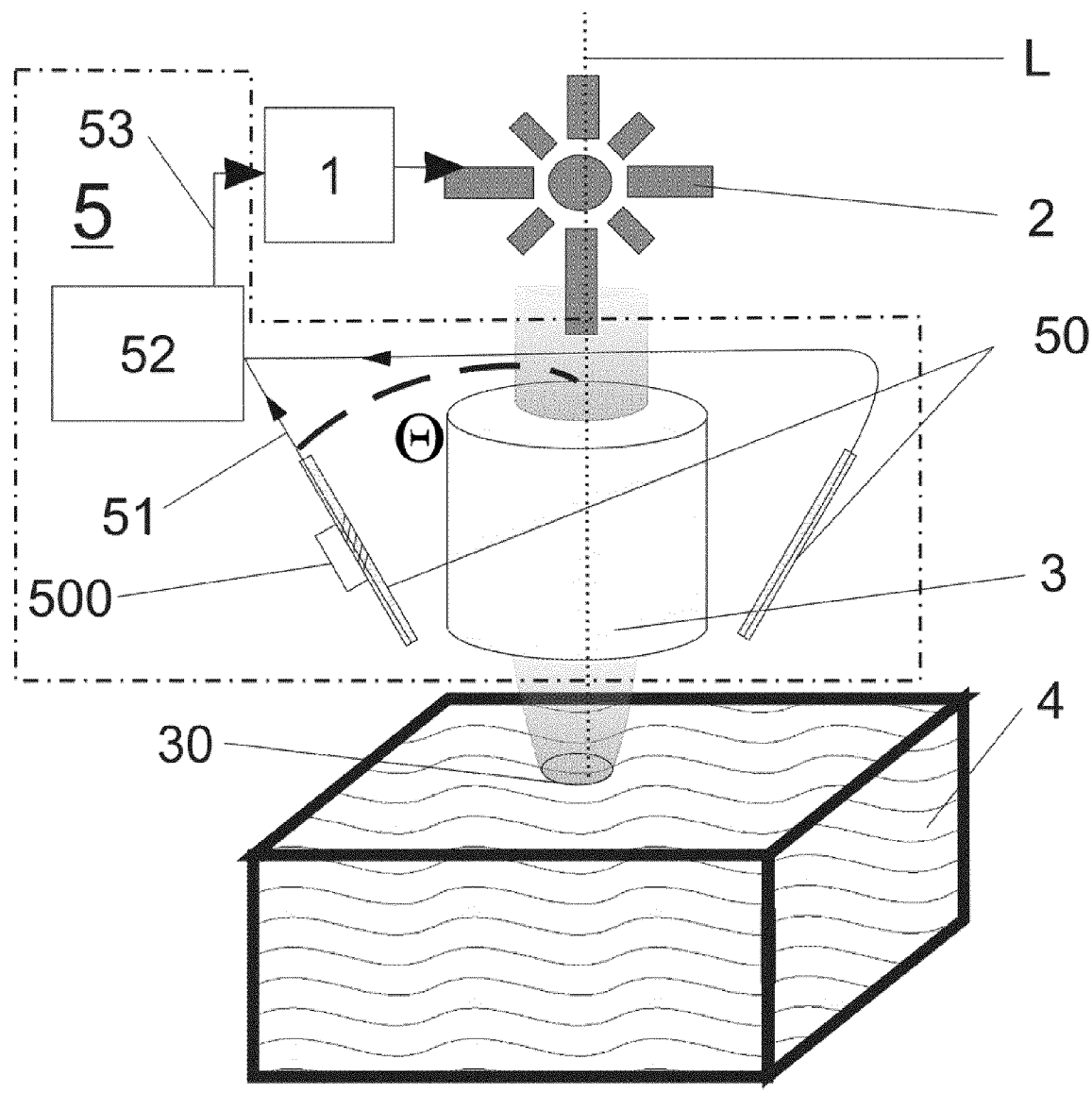
FIG. 1 shows a scheme of the entire system for ion beam, microwave or laser sintering or melting with quality control setup.

One aspect of the present invention is to introduce a novel method for quality control of an additive manufacturing (AM) process, in particular based on ion beam, microwave or laser powder sintering or melting (for both powder bed and ion and electron beams, microwave or laser powder deposition). This method aims to be a self-contained feedback control loop providing real time online monitoring of the additive manufacturing process. Also, an apparatus using the described method is disclosed.

An additive manufacturing setup comprises a ion and electron beams, microwave or laser irradiation system, comprising an ion and electron beams, microwave or laser electronics 1 controlling a ion and electron beams, microwave or laser source 2, a ion and electron beams, microwave or laser focusing device 3, that focuses the ion and electron beams, microwave or laser beam irradiation of the ion and electron beams, microwave or laser source 2 to an ion and electron beams, microwave or laser irradiation focused spot 30 on the powder material forming a sintering or melting body 4. As known from ion and electron beams, microwave or laser sintering or melting processes, the ion and electron beams, microwave or laser sinters or melts powder material.

For quality control of the additive manufacturing process, a sensor read out system is arranged in the near of the ion and electron beams, microwave or laser sintering or melting body 4. The sensor read out system 5 comprises at least one fiber optical sensor 50, signal lines 51, a processing unit 52 and a feedback loop 53. The processing unit 52 analyses the data from the acoustic emission fiber optical sensor 50.

While ion and electron beams, microwave or laser sintering or melting is carried out, at least one fiber optical sensor 50 reads out acoustic emission signals, which are forwarded by the signal lines 51 to the processing unit 52. In the processing unit 52, an analysis of the acoustic emission signals is carried out, as will be explained below. After analysis of the measured AE signals, the ion and electron beams, microwave or laser electronics 1 as well as the ion and electron beams, microwave or laser focusing device 3 can be adapted according to the measured and analysed signals to new improved parameters before the next ion and electron beams, microwave or laser sintering or melting (may be additive manufacturing) step is carried out. The signal processing unit 52 is connected via the feedback loop 53 to the ion and electron beams, microwave or laser electronics 1 for adaptation of the ion and electron beams, microwave or laser additive manufacturing process parameters.

Through, the additive manufacturing process, acoustic detection is carried out using a multiplicity of fiber optical sensors 50, which are symmetrically arranged around a process axis L. At least one fiber optical sensor 50 has to be arranged alongside the process axis L between the ion and electron beams, microwave or laser source 2 and the ion and electron beams, microwave or laser irradiation focused spot 30. Here, the fiber optical sensors 50 are located in the sintering or melting environment either with or without contact to the powder material 4. The fiber optical sensors 50 can be placed either distantly from the sintering or melting body 4 or in contact with it or even inside the powder material 4. By placing the fiber optical sensors 50 at specific positions, distance and orientation relative to the process axis L, the dynamic range can be adjusted for quality control measurements.

Optimized results were achieved by using a multiplicity of fiber optical sensors 50. All optical fiber sensors 50, respectively their fibre axis f, were tilted in an equal angle $\Theta$ with respect to the process axis L. It was discovered that the orientation of the optical fiber sensors 50 towards the process axis L affects the sensor's 50 sensitivity. By changing the angle $\Theta$, the sensitivity of the optical fiber sensor 50 can be varied. The range of $\Theta$ changes between 90 and 0 degrees, which has to be optimized to reach the needed sensitivity during the sintering or melting process. Best results can be achieved for angles $\Theta$ between 10° and 70°.

The in particular used optical fibre sensors 50 showed Bragg gratings 500 marked in FIG. 1 schematically. The optical fiber sensor is not limited to this specific type. Beside the optical fibre sensors 50 with Bragg gratings, Fabry-Perot fibres, fibre interferometers or any combination of those, were used. A Fabry-Perot cavity can be formed in optical fiber either by placing a mirrored end face or by inscribing two FBGs in close proximity or by inducing a phase shift within the FBG length or by using a single FBG and a cleaved fiber edge. There are many ways and we used a fiber with a Fabry Perot cavity. These fiber optical sensors 50 are very sensitive to AE which in turn induces vibration in the fiber and thus changes its optical properties.

In real life conditions, the acoustic wave is weakly distorted while propagating in air/surrounding gas, therefore, those distortions are not critical and can be ignored. Acoustic wave is detectable at some distance from the process zone. Amplification of the signal is also possible by placing an amplifying element inside the powder. Powder is an acoustic insulator due to the size of the particles and multiple interfaces between them.

Signal is extremely weak and detectable only at specific parameters of the fiber optical sensor read out system 5, such as fibre optical strain, spectral reflectivity of the Bragg grating (the sharpness of the reflectivity spectral zone), operating wavelength and fibre core material.

The main feedback parameter here for control of the intensity of the additive manufacturing ion and electron beams, microwave or laser sintering or melting is the acoustic emission (AE), induced by the rapid development of the temperature in the irradiated zone and the temperature gradient inside the powder material 4. While the ion and electron beams, microwave or laser sintering or melting, all the data from all fiber optical sensors 50 is transferred to the signal processing unit 52 via signal lines 51 and digitized there.

In the signal processing unit 52, the measured and digitized acoustic signals are analysed. This analysis can be done in different ways.

From the analysis, the current sintering or melting quality can be estimated, either by comparison with a known (expected values) or by calculation.

The signal processing unit 52 can detect whether the sintered or melted parts contain defects that are not acceptable in terms of sintering or melting quality. If the sintering or melting quality does not meet the requirements, an adjustment of the ion and electron beams, microwave or laser parameters can be adapted by the signal processing unit 52 via the feedback loop 53 automatically in the ion and electron beams, microwave or laser electronics 1 for the upcoming sintering or melting. Beside the ion and electron beams, microwave or laser electronics 1 optionally the ion and electron beams, microwave or laser focusing device 3 could be adjusted via the feedback loop 53 by the processing unit 52. With the adapted irradiation parameters, optimized sinter or melt quality can be achieved in forthcoming sintering or melting. Beside using acoustic emission signals for quality control, the sintering or melting quality can be directly optimized during the same manufacturing process, on the level of single sintering or melting event.

Using AE for sintering or melting control is under investigation. It was observed that AE correlate with the particularities of sintering or melting events, namely power density of laser irradiation, size and material of the powder particles, configuration of sintered particles or melts on the surface of the powder (FIGS. 4*a* and 4*b*).

The signals themselves are very weak and this brings to additional requirements of the detector sensitivity (to provide acceptable noise/signal ratio) and processing routine. The optical fibres of the FBG sensors, which provide detection of the acoustic emission of the sintering or melting process, should provide the elongation to the pressure wave in the range of 244-0.1 nm/MPa.

To check the feasibility of detection of the signals differences, we used machine statistical and classification methods which were applied to recorded AE signals (FIGS. 2*a* and 2*b* and FIGS. 3*a* and 3*b*). Those methods represent an automatic algorithmic framework which allows for determining the unique AE signatures of each sintering or melting event and using those for automatic classification of quality control.

Basic algorithmic framework was designed to check the feasibility of the method proposed and described below (FIGS. 5-8). In general, the algorithmic framework includes two stages:
1) Extraction of AE features (the combination of those describe the uniqueness of the AE) and
2) The classification itself. According to this the results are presented in the figures.

The following figures are showing experimental results using optical fiber sensors 50 with Bragg gratings. FIGS. 2*a* and 2*b* and FIGS. 3*a* and 3*b* present the AE signals, emitted by the particle powder affected by laser induced heat. All further computational results, presented in the following Figures are obtained using these signals.

FIGS. 5a-d and FIGS. 6a and 6b present the sequence of algorithmic framework steps for automatic recognition of AE, while applying 1 and 2 laser pulses. In this way, the recorded signals using FBG in FIGS. 2a and 2b and FIGS. 3a and 3b are decomposed using wavelet packets. The decomposition is made using Daubechies with 10 vanishing moments. The energies for the wavelet packet tree nodes for all signals were computed and taken as features for further analysis. The corresponding features from the acoustic signals from one and two shots are presented in the FIGS. 5a and 5c. Afterwards the Principal Component Analysis (PCA) is applied to the extracted features and the variance between the features of the acoustic signals from 1 and 2 laser shots is computed. The variance stored within the features is depicted in the FIGS. 5b and 5d. For further analysis, only the features that provide the most variance are selected. The features selected this way are further fed to the classifier that estimates the sintering or melting quality.

FIGS. 6, 7 and 8 present the differences in the AE signals for sintering or melting using 1 laser pulse but with different power irradiation. The corresponding comments are given below.

Figure 2A:
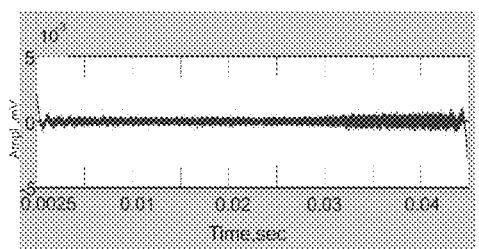
Figure 2A:
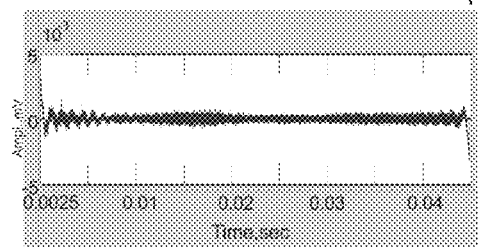
Figure 2A:
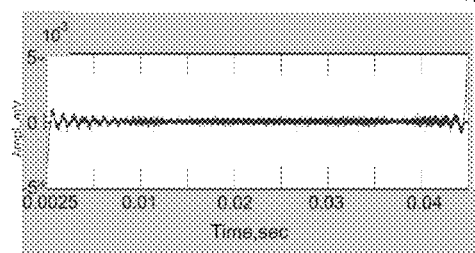
Figure 2A:
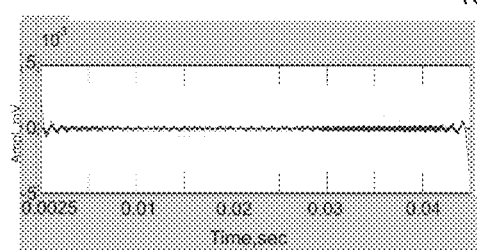
Figure 2A:
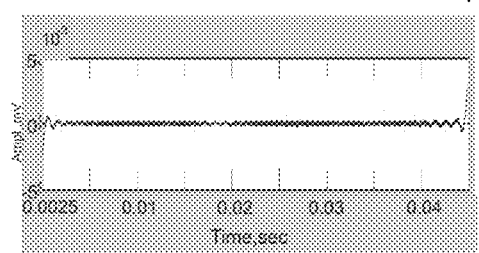

FIG. 2a present the response of the optical fiber sensor 50 (FBG) to the AE, during sintering or melting of iron micro particles. The particles were heated by one laser pulse and recordation of the AE signals was carried out using optical fiber sensor 50 in form of fibre with Bragg gratings 500 (FBG sensor), placed away from the sintered or melted zone. The pulse width was 500 micro seconds; laser power varied in the range of 1100-1500 W and was focused at a diameter of 30 microns in the laser irradiation focused spot 30.

Figure 2B:
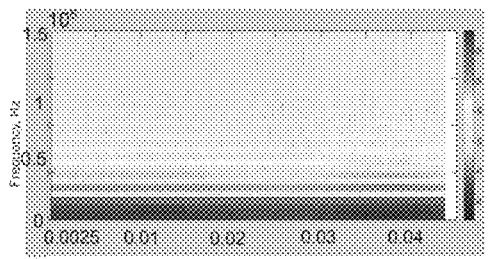
FIG. 2b shows the associated frequency spectrograms at different laser pulse energies. The process parameters are as follows:
pulse width—500 μs,
diameter of focused spot—30 microns,
average size of iron particles—50 microns,
number of pulse—1.
Figure 2B:
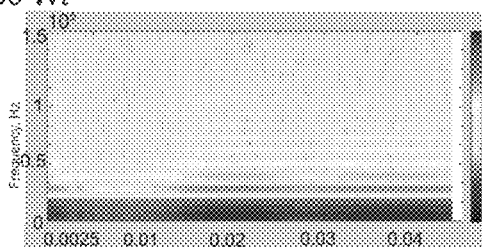
Figure 2B:
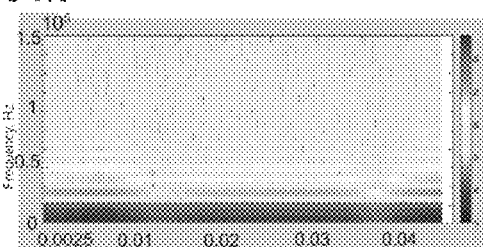
Figure 2B:
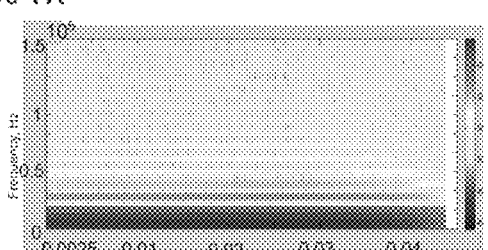
Figure 2B:
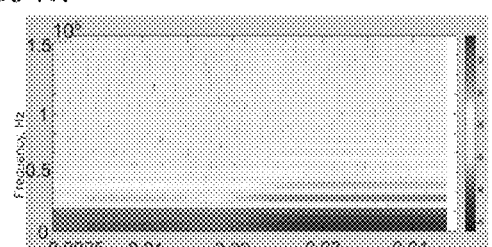

FIG. 2b also include the spectrograms of AE signal for the whole duration of the process. The recording time of each AE signal was 50 milliseconds. As can be observed from the spectrograms, the major signal energy is stored in the range of 0-100 kHz. The discrete characteristics of the signal are due to the sensor transfer function.

FIGS. 3a and 3b present the response of the optical fiber sensor (FBG) on the AE from the reiterated sintering or melting by heating particles volume by the sequence of two laser pulses. The parameters of the laser pulses were the same as described in FIGS. 2a and 2b. The corresponding spectrograms (FIG. 3b) show the spectral content of the signals in time domain. The majority of the energy, brought by AE signals is also stored in the range of 0-100 kHz (as in one pulse case).

FIGS. 4a and 4b present the images of the sintering or melting body using one (FIG. 4a) and two (FIG. 4b) laser pulse sequences. As can be observed from the images, the sintering or melting has a different volume configuration depending on the applied light power. On one pulse, the main sintering or melting is in the zone of irradiation with few sintered or melted particles on its periphery. As can be observed the sintering or melting is in the center of light focus and has the shape of a sphere. The dimensions of the sintered or melted zone were observed as a function of the laser irradiation power.

After applying two pulses (FIG. 4b), the sintered or melted area expanded tremendously, while the major sintering or melting area was not uniform and encapsulated some fractures of non-melted particles powder. This affects the mechanical properties of the sintered or melted area.

FIGS. 5a-5d present the results for wavelet decomposition of signals from FIGS. 2a and 2b. Feature is the pattern of the signal, which is invariant to extern conditions. In statistical approach, those patterns are extracted from the set of preliminary made measurements and this set is called a training dataset.

More details and different technique for features extraction can be found in (Long F., Xue H., Research on Signal Analysis Method of Acoustic Emission of Material 2.25Cr-1Mo Based on Wavelet Filter and Clustering; Recent Advances in Computer Science and Information Engineering, Lecture Notes in Electrical Engineering Volume 126, 2012, pp 821-827, Lyons R. G. Understanding Digital Signal Processing (3rd Edition), 11, 2010).

The set of extracted features creates the unique signature of the signal and thus can be used for recognition of the signal even in an environment which differs from the one that was used for training data set (Zheng J., Shen S., Fan H., Zhao J. An online incremental learning support vector machine for large-scale data; Neural Computing and Applications, Volume 22, Issue 5, pp 1023-1035, 2013). The features sets carry the information about the real physical phenomena and thus can be interpreted in terms of processes quality.

As a feature extraction technique wavelet packet decomposition (WPD) of AE can be used. In this method, the features are described by the energy stored in separate wavelet packets. WPD is the extension of the standard wavelet theory (Mallat S. A Wavelet Tour of Signal Processing, Third Edition: The Sparse Way, 2008, Daubechies I., Ten lectures on wavelets, 1992, ISBN: 978-0-89871-274-2, eISBN: 978-1-61197-010-4) that proved itself as a robust method in a variety of practical applications. The idea behind wavelets transforms is the signal decomposition using the orthonormal basis formed by specific functions, called wavelets. The advantage of wavelets decomposition and WPD compared to standard frequency methods (A. Papandreou-Suppappola, Applications in Time-Frequency Signal Processing, CRC Press, Boca Raton, Fla., 2002) is in the localization of signal local patterns in both—frequency and time domains. Despite the obvious advantages of this method, its results are greatly dependent on the choice of the basis wavelets.

For our analysis, we used Daubechies wavelet (db10) which proved to be suitable for a wide variety of non-deterministic signals.

The WPD procedure operates as follows. First, the original signal is split into two parts using standard wavelet decomposition, which was described above. Those parts correspond to low and high frequency components of the original signal with the specified frequency range for both sides. This procedure is repeated and applied sequentially to already split parts resulting in the increase of the decomposition elements. The number of the operation iterations is defined by the decomposition level and the whole procedure can be represented as a tree.

The tree nodes are called packets and each level of the decomposition (e.g. the number of nodes levels in the tree) defines the resolution in time-frequency domain. In our investigation, the chosen decomposition level was 11 (the maximum that suited the acquired signals), and as the features the energy stored in packets was taken (what corresponds to the energy of specific frequency bands).

Due to the great number of packets that occurred at selected decomposition level (see the present FIGS. 5b and 5d), a reduction of the packets should be carried out. This operation aims to reduce those packets, which do not give any impact in the recognition efficiency as presented in all signals and thus cannot be used for signal distinguishing.

To choose main (or as they are so-called—principal) features the principal component analysis—PCA can be used (Jolliffe I. T. Principal Component Analysis, Series: Springer Series in Statistics, 2nd ed., Springer, N Y, 2002, XXIX, 487 p. 28 illus. ISBN 978-0-387-95442-4).

The idea of this method is to select only those packets of the WPD tree, which have the highest variance and thus provide the best separation of several sintering or melting events.

There are several other possibilities to extract important features from the signal. For example, by using standard Fourier transform (Smith S. W., The scientist and engineers guide to digital signal processing; California technical publishing, 2011), or by using neural networks for both features extraction and classification (Keynote talk: "Achievements and Challenges of Deep Learning—From Speech Analysis and Recognition To Language and Multimodal Processing," Interspeech, September 2014).

Figure 6A:
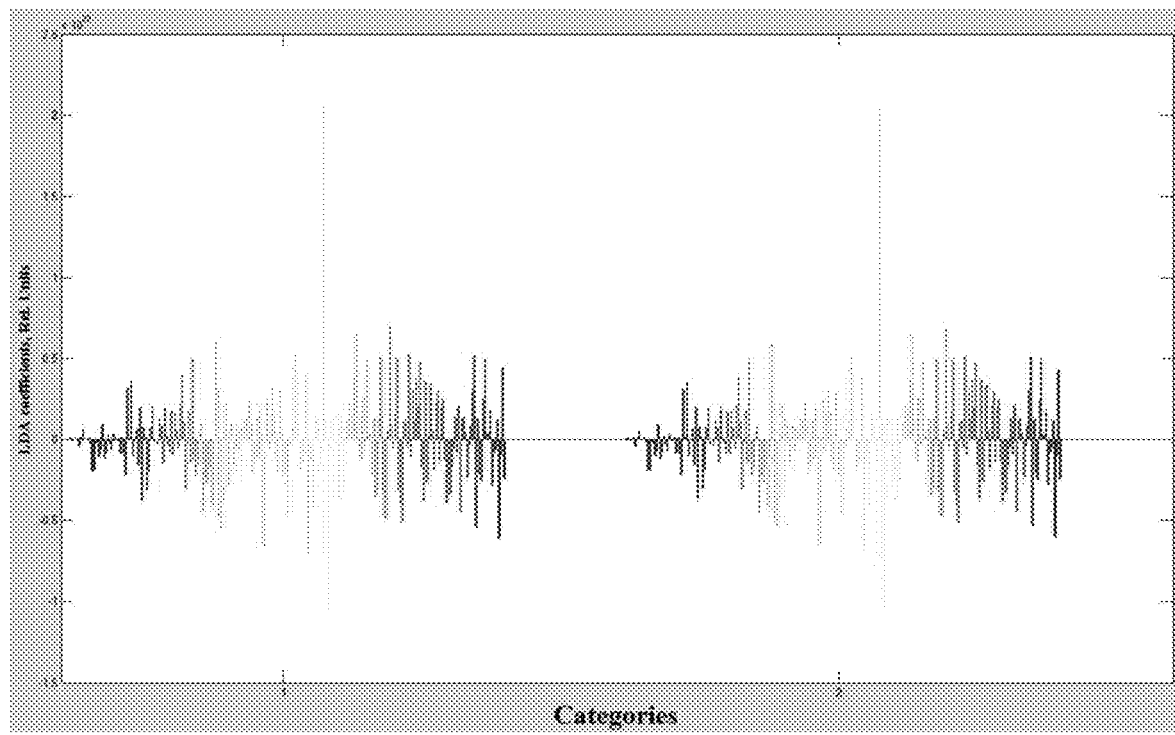
FIGS. 6a and 6b are showing classification results for 5 using linear discrete analysis (LDA) algorithm, with coefficients, presented in (FIG. 6a) and the scores, assigned to the signals from different categories (FIG. 6b). As features, the energy of each node of wavelet packet tree was used and the number of those features was reduced by selecting the nodes with the maximum variance (those selected nodes are shown in the previous Figure).
Figure 6B:
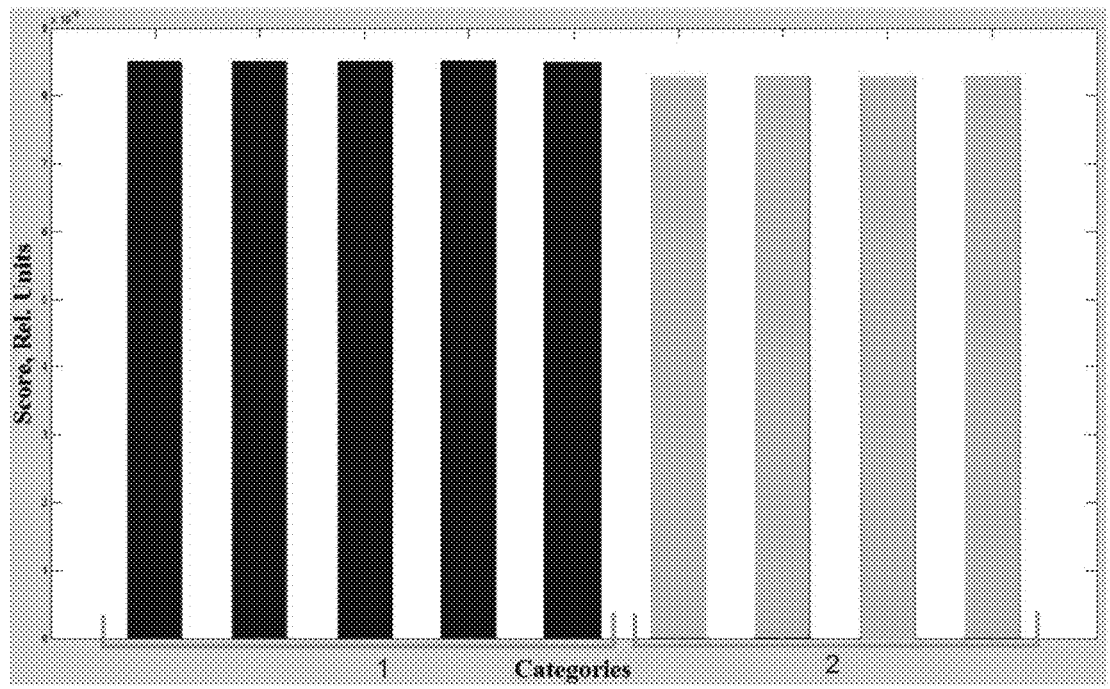

FIGS. 6a and 6b present the automatic classification results of the features extracted in the previous stage. The reduced amount of wavelet packet tree nodes included into principal components creates the feature set that can be classified. To do so, the linear discriminant analysis (LDA) was used (Duda, R. O.; Hart, P. E.; Stork, D. H. Pattern Classification; (2nd ed.). Wiley Interscience. ISBN 0-471-05669-3. MR 1802993). The main idea of the LDA is the design of a series of linear predictors (linear functions) which transform the features sets assigning them some specific number (a score). Each category of events has its own score and thus is recognizable. The coefficients of the transform functions are presented in (6a), while the score after classification of several signals is shown on (6b). As can be observed, the simplest linear classification scheme recognizes the difference in between AE signals, obtained in case of powder sintering or melting with 1 and 2 pulses. As can be observed, the classifier assigns different scores to the signals from different categories and thus distinguishes them.

Here, several other classification schemes can be applied to increase the efficiency of the algorithmic framework. For example, the non-linear extension of the LDA can be applied (Gu S, Tan Y., He X. Discriminant analysis via support vectors; Neurocomputing, 73, 1669-1675, 2010), or support vector machines (Vapnik und Chervonenkis, Theory of Pattern Recognition, 1974 (Wapnik und Tschervonenkis, Theorie der Mustererkennung, 1979), or neural networks (D. Ciresan, A. Giusti, L. Gambardella, J. Schmidhuber. Deep Neural Networks Segment Neuronal Membranes in Electron Microscopy Images. In Advances in Neural Information Processing Systems, 2012).

Figure 7A:
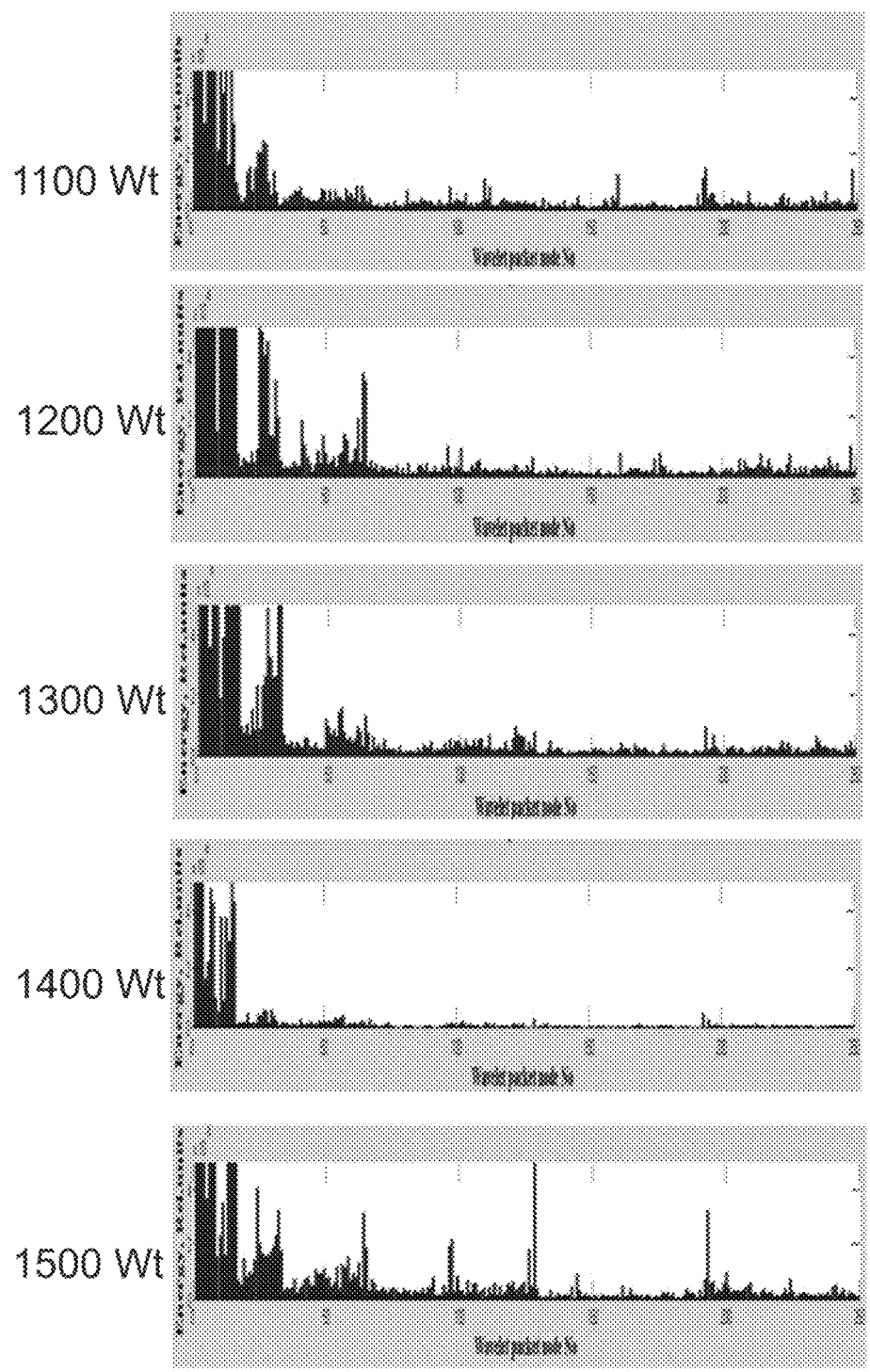
FIGS. 7a and 7b are showing energy distribution in wavelet packet nodes for AE signals, obtained from different power of laser irradiation (FIG. 7a) and the nodes that were selected after features reduction using for example Principal Component Analysis (PCA) algorithm (those nodes provide with the maximum variance) (FIG. 7b).
Figure 7B:
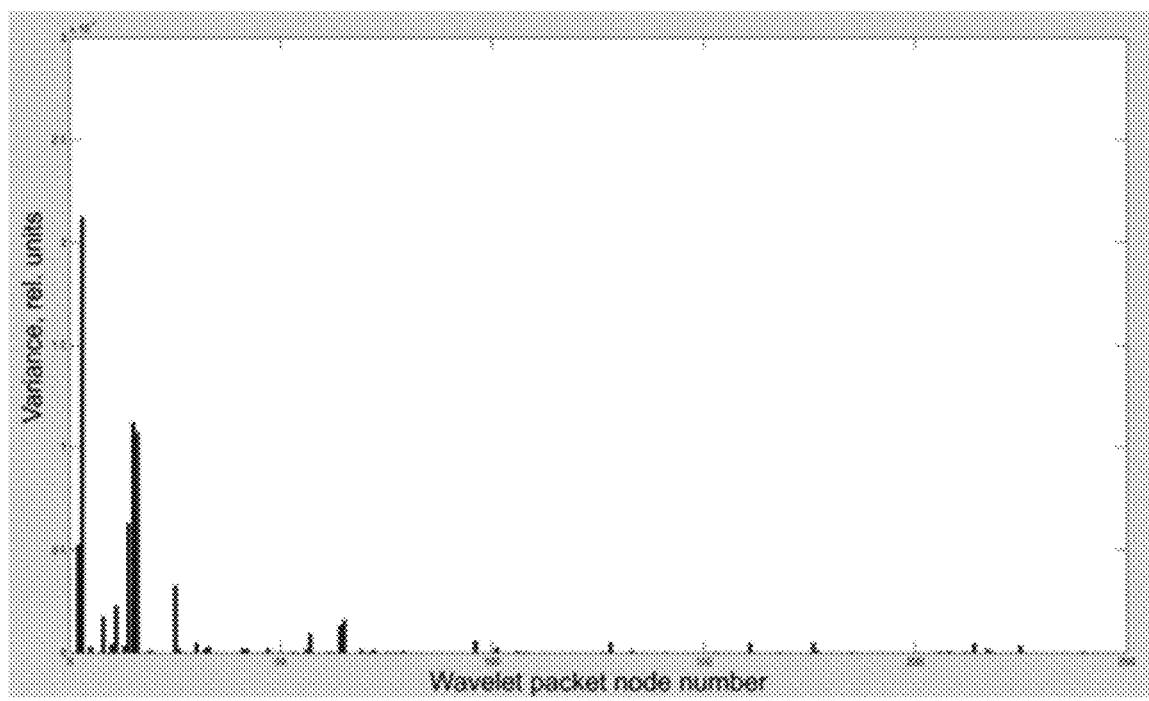

FIGS. 7a and 7b present the results for distinguishing the differences in AE signals, obtained from sintering or melting by one laser pulse but varying the laser power. Here, we similarly used the wavelet packet decomposition method in order to decompose the signals from FIGS. 2a and 3a. The AE signals were decomposed using Daubechies wavelet (db10). The energies distribution in the nodes for different signals is presented in the Figure. The PCA was applied to the nodes to find out the principal one that define the main differences in between all presented signals. The results of PCA are presented in the same Figure (FIG. 7b). As it can be observed, several nodes are different for all the signals and thus create the unique description for each signal that can be recognized by the machine.

Figure 8A:
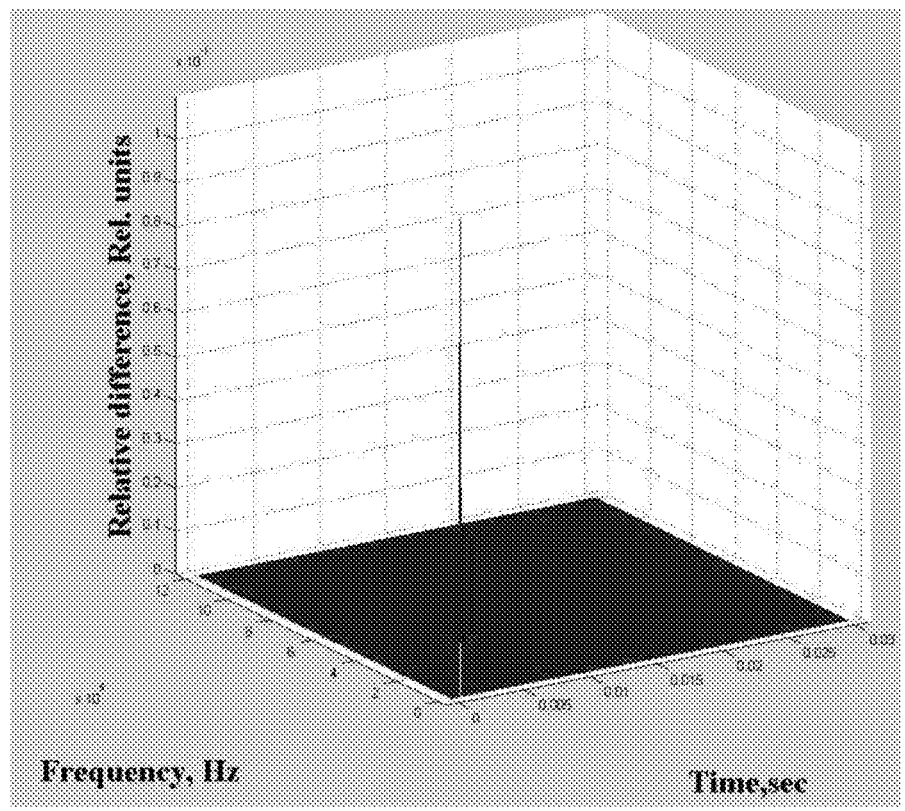
FIGS. 8a and 8b are showing the dynamic range of the selected nodes from the previous figure in time-frequency domain: the whole range (FIG. 8a) and the zoom (FIG. 8b).

In FIG. 8a the frequency bands, stored in principal nodes, which are shown in FIGS. 7a and 7b, are presented in the time-frequency domain. As can be observed from the Figure, the main differences between different signals are stored in the frequency range of 0-60 kHz and thus can be used for automatic recognition using the technique described in the comments of FIGS. 6a and 6b.

Figure 8B:
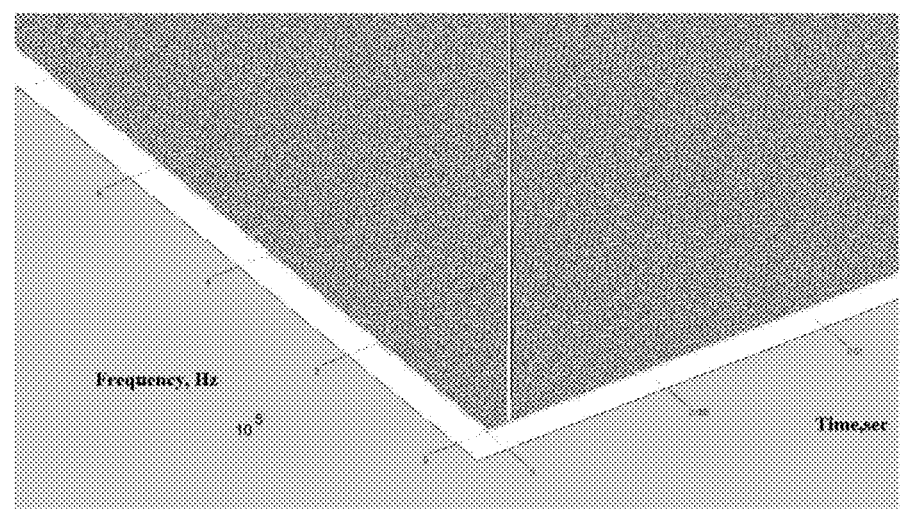

FIG. 8b depicts the chosen principal nodes, described in comments of FIGS. 7a and 7b and transferred to the time-frequency domain. It shows the spectral range, in which the differences in signals can be detected and used for further automatic classification. The classification scheme here can be completely analogous to the one, presented in the description of FIGS. 4-6.

Figure 9:
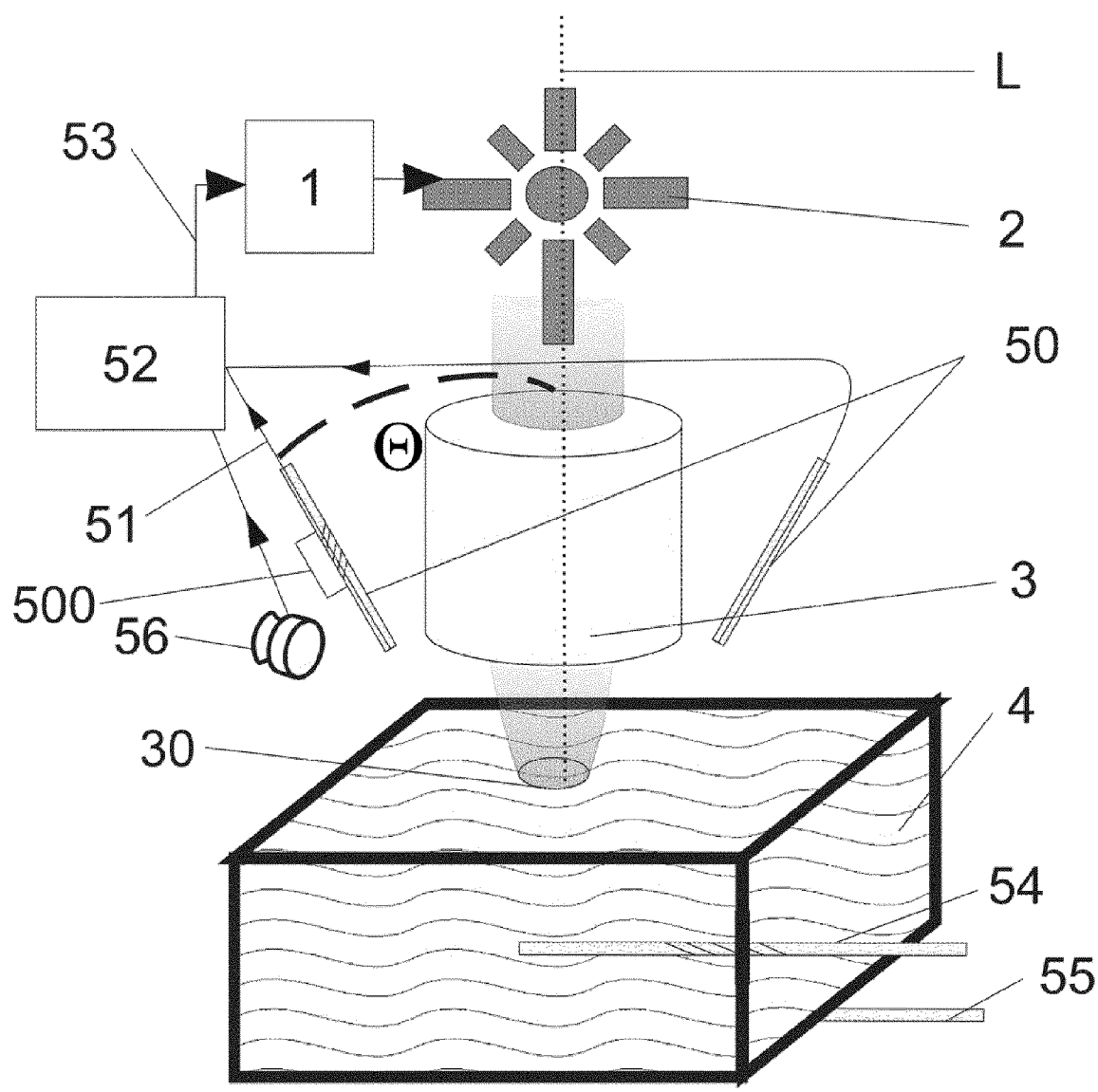
FIG. 9 shows a scheme of another system with additional optional photo sensor.

In FIG. 9, another quality control setup 5 for sintering and melting process is depicted. As shown, a fiber optical sensor 54 can be placed inside the sintering or melting body 4 or a fiber optical sensor 55 can be placed outside of the sintering or melting body 4 on the side opposing the side of the incident radiation.

At the radiation side, an additional optional photo sensor 56 can be placed, connected to the processing unit 52.

Optionally, the processing of optical emission (back reflected/emitted light from the process zone) can be performed using the same methods as described in FIGS. 5a-5d. The extracted information can then be unified with the information, extracted from the AE and classification for the unified data can be computed further as described in FIGS. 6, 7, 8. The corresponding additional optional photo sensor 56 may be placed outside the focusing system and this position is shown in FIG. 9. Alternatively the additional optional photo sensor 56 or a multiplicity thereof can be built in the focusing device 3. With the at least one optional photo sensor 56, a detection of back reflection of the incident irradiation (ion and electron beams, microwave or laser) and/or optical emission of process zone is possible.

LIST OF REFERENCE NUMERALS 1 ion and electron beams, microwave or laser electronics
2 ion and electron beams, microwave or laser source
3 ion and electron beams, microwave or laser focusing device
   30 ion and electron beams, microwave or laser irradiation focused spot
4 sintering or melting body/powder material
5 quality control setup/sensor read out system
   50, 54, 55 fiber optical sensors
      500 fiber Bragg gratings
   51 signal lines
   52 processing unit
   53 feedback loop
   56 additional optional photo sensor
L process axis
f fiber axis

The invention claimed is:

1. A method for in situ and real time quality control of an additive manufacturing process in an ion beam, electron beam, microwave, or laser sintering or melting setup, using an ion beam, electron beam, microwave, or laser source and an ion beam, electron beam, microwave, or laser focusing device controlled by ion beam, electron beam, microwave, or laser electronics for focusing the ion beam, electron beam, microwave, or laser beam on a process surface of a sintering or melting body in an ion beam, electron beam, microwave, or laser irradiation focused spot with controllable ion beam electron beam, microwave, or laser parameters during the running additive manufacturing process, the method comprising:

real time detection of acoustic waves emitted through the process zone and induced by the sintering or melting pulses by using at least one optical fiber sensor in form of fibers with Bragg grating, fibre interferometers or Fabry-Perot structures, wherein the at least one optical fiber sensor is arranged separated from the sample and source alongside a process axis between the ion beam, electron beam, microwave, or laser source and the ion beam, electron beam, microwave, or laser irradiation focused spot, and the at least one optical fiber sensor respectively a fiber axis is tilted in an angle of range 0° to 90° relative to the process axis, transfer of the measured sensor signals via at least one signal line to a processing unit, digitizing measured sensor signals and subsequent analysis of the digitized sensor signals in the processing unit by an algorithmic framework providing extraction and classification of measured acoustic emission features for quality control of the sintering or melting process, determination of improved future additive manufacturing parameters, before transfer of the improved additive manufacturing parameters via a feedback loop from the processing unit to the ion and electron beams, microwave or laser electronics for application of the improved additive manufacturing parameters in the upcoming ion beam, electron beam, microwave, or laser sintering or melting step, wherein the correlation of acoustic emission with additive manufacturing quality is done by wavelet packet decomposition (WPD) as extraction technique as part of the algorithmic framework.

2. The method for in situ and real time sintering or melting quality control according to claim 1, wherein for choosing principal nodes, principal component analysis (PCA) is used in the processing unit as part of the algorithmic framework.

3. The method for in situ and real time sintering or melting quality control according to claim 1, wherein features from the measured sensor signals are extracted by using standard Fourier transform as part of the algorithmic framework in the processing unit.

4. The method for in situ and real time sintering or melting quality control according to claim 1, wherein features from the measured sensor signals are extracted by using neural networks for both features extraction and classification as part of the algorithmic framework in the processing unit.

5. The method for in situ and real time sintering or melting quality control according to claim 1, wherein a multiplicity of fiber optical sensors surrounding the process axis symmetrically is used for measuring acoustic emission, while all optical fiber sensors, respectively their fiber axis are tilted in equal angles with respect to the process axis.

* * * * *